US008234593B2

(12) United States Patent
Gordon et al.

(10) Patent No.: US 8,234,593 B2
(45) Date of Patent: Jul. 31, 2012

(54) SYNCHRONIZING A VISIBLE DOCUMENT AND A VIRTUAL DOCUMENT SO THAT SELECTION OF TEXT IN THE VIRTUAL DOCUMENT RESULTS IN HIGHLIGHTING OF EQUIVALENT CONTENT IN THE VISIBLE DOCUMENT

(75) Inventors: Glen Gordon, Fitchburg, WI (US); Joseph Stephen, Eden Hills (AU)

(73) Assignee: Freedom Scientific, Inc., St. Petersburg, FL (US)

( * ) Notice: Subject to any disclaimer, the term of this patent is extended or adjusted under 35 U.S.C. 154(b) by 501 days.

(21) Appl. No.: 12/399,523

(22) Filed: Mar. 6, 2009

(65) Prior Publication Data
US 2009/0287997 A1 Nov. 19, 2009

Related U.S. Application Data

(60) Provisional application No. 61/034,573, filed on Mar. 7, 2008.

(51) Int. Cl.
G06F 3/00 (2006.01)
(52) U.S. Cl. .......................... 715/865; 715/729; 715/239
(58) Field of Classification Search .................... None
See application file for complete search history.

(56) References Cited

U.S. PATENT DOCUMENTS

| 6,085,161 | A | 7/2000 | MacKenty et al. |
| 6,725,424 | B1 * | 4/2004 | Schwerdtfeger et al. ..... 715/239 |
| 6,745,163 | B1 | 6/2004 | Brocious et al. |
| 6,993,707 | B2 | 1/2006 | Baker et al. |
| 7,058,887 | B2 | 6/2006 | Cragun |
| 2004/0139400 | A1 | 7/2004 | Allam et al. |
| 2005/0034063 | A1 * | 2/2005 | Baker et al. ................... 715/513 |
| 2007/0009161 | A1 | 1/2007 | Hollingsworth |
| 2007/0130510 | A1 | 6/2007 | Dharamshi et al. |

OTHER PUBLICATIONS

King A et al: "WebblE: a browser for visually impaired people", Proceedings of the 2nd Cambridge Workshop on Universal Access and Assistive Technology Cambridge University Press Cambridge, UK, [Online] 2004, pp. 35-44, XP000002657491, Retrieved from the Internet: URL:http://citeseerx.ist.psu.edu/viewdoc/download-?doi=10.1.1.98.9084&rep=rep1&type=pdf> [retrieved on May 26, 2011].
Thatcher J: "Assistive Technology: Screen Readers and Browsers", Web Accessibility : Web Standards and Regulatory Compliance, vol. part 2, Jan. 1, 2006, pp. 103-124, XP008137071, ISBN: 1-59059-638-2 [retrieved on Mar. 20, 2007].
Kurniawan S H et al: "Personalising web page presentation for older people", Interacting With Computers, Butterworth-Heinemann, GB, vol. 18, No. 3, May 1, 2006, pp. 457-477, XP025079340, ISSN: 0953-5438, DOI: DOI:10.1016/J.INTCOM.2005.11.006 [retrieved on May 1, 2006].

(Continued)

Primary Examiner — Stephen Hong
Assistant Examiner — Asher Kells
(74) Attorney, Agent, or Firm — GrayRobinson, P.A.; Michael J. Colitz, III

(57) ABSTRACT

Disclosed is a system and method for synchronizing virtual and physical documents. The system can be used in conjunction with screen reading software for synchronizing the screen reader's virtual representation of a component to components that are visually displayed to a sighted user.

12 Claims, 4 Drawing Sheets

OTHER PUBLICATIONS

Zhao L et al: "Mozilla accessibility on Unix/Linux", Proceedings of the International Cross-Disciplinary Workshop on Web Accessibility, 2005 W4A At the World Wide Web Conference, WWW2005, [Online] 2005, pp. 90-98, XP000002657492, Retrieved from the Internet: URL:http://portal.acm.org/citation.cfm?id=1061829> [retrieved on May 26, 2011].

Spalteholz L et al: "Efficient navigation on the world wide Web for the physically disabled", Third International Conference on Web Information Systems and Technologies, Webist 2007, 2007, pp. 321-327, XP008137232, Setubal, Portugal ISBN: 978-972-8865-78-8.

Reexmination U.S. Appl. No. 90/010,473, of Patent No. 6993707.

* cited by examiner

Fig. 3

| ACP | Description | Character Data |
|---|---|---|
| 0 | NoScope Image | |
| 1 | EnterScope Paragraph | |
| 2-4 | Text | "My " |
| 5 | EnterScope Bold | |
| 6-11 | Text | "Clever" |
| 12 | ExitScope Bold | |
| 13-17 | Text | " son." |
| 18 | ExitScope Paragraph | |

Fig. 4

| ACP | Desc | Character Data |
|---|---|---|
| 0-21 | Graphic | Image of a boy reading |
| 22 | LineBreak | \n |
| 23 | LineBreak | \n |
| 24-26 | PlainText | "My " |
| 27-32 | BoldText | "clever" |
| 33-36 | PlainText | " son." |
| 37 | LineBreak | \n |
| 38 | LineBreak | \n |

Fig. 5

| Node Offset in Virtual | Virtual ACP | Physical ACP | Physical Element |
|---|---|---|---|
| 0-21 | 0-21 | 0 | <IMG> |
| 0-1 | 22-23 | 1 | <P> |
| 0-2 | 24-26 | 2-4 | "my " |
| 0-5 | 27-32 | 5-12 | <B>clever</B> |
| 0-3 | 33-36 | 14-17 | "son. " |
| 0-1 | 37-38 | 18 | </P> |

SYNCHRONIZING A VISIBLE DOCUMENT AND A VIRTUAL DOCUMENT SO THAT SELECTION OF TEXT IN THE VIRTUAL DOCUMENT RESULTS IN HIGHLIGHTING OF EQUIVALENT CONTENT IN THE VISIBLE DOCUMENT

RELATED APPLICATION DATA

This application claims benefit of application Ser. No. 61/034,573 filed on Mar. 7, 2008 entitled "ON SCREEN SYNCHRONIZATION OF SELECTION IN VIRTUAL DOCUMENT." The contents of this application are fully incorporated herein.

BACKGROUND OF THE INVENTION

In the electronic age, information is provided to computer users by way of a display. This information can include text, graphics, movies and other items presented to a user in a certain layout. This system, designed with the sighted-user in mind, has certain deficiencies when the user is a low-vision or blind user ("low-vision user"). Low-vision users typically rely upon screen readers to navigate and interact with computer systems.

Historically, screen readers have offered a virtual presentation of a webpage which enables the user to read the text and interpret the graphics, headings, links and other constructs on a webpage in an intelligible manner. Such presentations offer a rudimentary synchronization of what is visually onscreen with what the screen reader user is reading by ensuring that the text being read by the user is physically visible as they arrow through the document. When the low vision user selects text to copy to the clipboard, however, the text from the screen reader's virtual document is copied without any formatting associated with the equivalent physically displayed text. There is also no indication on screen of the selection within the virtual document as the virtual representation of the document uses words and extra text to describe physical characteristics of the real document and thus is logically but not physically equivalent. For example, if a low-vision user visits a webpage containing a table of information, a screen reader will typically read the information, contained within the table to the low-vision user. If the user wishes to copy and paste this information, historical screen readers allow the user to select the information within the screen reader, but this does not maintain the structural elements of the information, namely the table layout. Thus, when pasted, the information will not maintain the formatting and structure it had when it was originally presented.

SUMMARY OF THE INVENTION

In various embodiments, the present invention enables true synchronization of the virtual and physical document, even when selecting text in the virtual document. That is, when the user selects text in the virtual representation of the real document, the equivalent physical web content is highlighted on the screen as if the user used a mouse to select the equivalent content. The system can then rely upon existing copy, selection, highlight and other functionality to provide similar functionality to low vision users as is provided to sighted users. Thus, when a low-vision user copies information to the clipboard, all characteristics of the displayed content may also be preserved. This would mean, for instance, that copying the virtual representation of tabular data from the web to a word processor would result in the true table with all of its formatting being copied.

In order to achieve this, intelligent code running in a computer system manages the relationship between the virtual document maintained and presented to the low-vision user and the actual physical document that would be presented to a sighted user on a graphical display, such as a monitor, LCD, television, cellular telephone, personal digital assistant, or any other visual display. By managing this relationship, the intelligent code embodying this invention can translate a low-vision user's selection of content within a screen reader's virtual document presentation of a document to the actual physical location that is displayed to a sighted user.

Because low-vision users are unable to see the graphical displays relied upon by sighted users, what is needed, and what is provided by certain embodiments of the invention herein, is the ability to translate movements within a screen reader to coordinates within a graphically displayed document. What follows below is a discussion of the presentation of information in WebPages to low-vision users. But a person having ordinary still in the art will appreciate the applicability of the system described below to any visually displayed information, such as word processing documents, financial registers, and any other electronically displayed information.

Thus, embodiments of the invention herein may provide a novel system and method for mapping the layout elements of electronic documents to their presentation within a screen reader utilized by a low vision user such that the low-vision user can select, copy, paste, cut, and otherwise manipulate and interact with both the content of the electronic document and the layout of the content.

These or other embodiments of the present invention may map the low-vision user's screen reader to the display such that when the low-vision user selects, copies, pastes, cuts and otherwise manipulates content and layout of documents within the screen reader equivalent actions are displayed on the screen, for instance highlighting text on the visual display when the low-vision users selects that same text within the screen reader.

Additional features of the invention will be described hereinafter which form the subject of other aspects of the invention. It should be appreciated by those skilled in the art that the conception and the specific embodiment disclosed may be readily utilized as a basis for modifying or designing other structures for carrying out the same purposes of the present invention. If should also be realized by those skilled in the art that such equivalent constructions do not depart from the spirit and scope of the invention as set forth in the appended claims.

BRIEF DESCRIPTION OF THE SEVERAL VIEWS OF THE DRAWING

Various other objects, features and attendant advantages of the present invention will become apparent to one with skill in the art upon examination of the accompanying drawings and detailed descriptions. It is intended that these objects, features and attendant advantages be included as the same when considered in conjunction with the accompanying drawings, in which like reference characters designate the same or similar parts through the several views and wherein:

FIG. 3 is a table depicting the markup pointers utilized by INTERNET EXPLORER® to maintain the absolute character position of elements within a webpage;

FIG. 4 is a table depicting the virtual representation of the elements of a webpage under the invention herein;

FIG. 5 is a table depicting the mapping of the virtual representation of FIG. 4 to the absolute character position table of FIG. 3;

Similar reference characters refer to similar parts throughout the several views of the drawings.

DETAILED DESCRIPTION OF THE INVENTION

Figure 1:
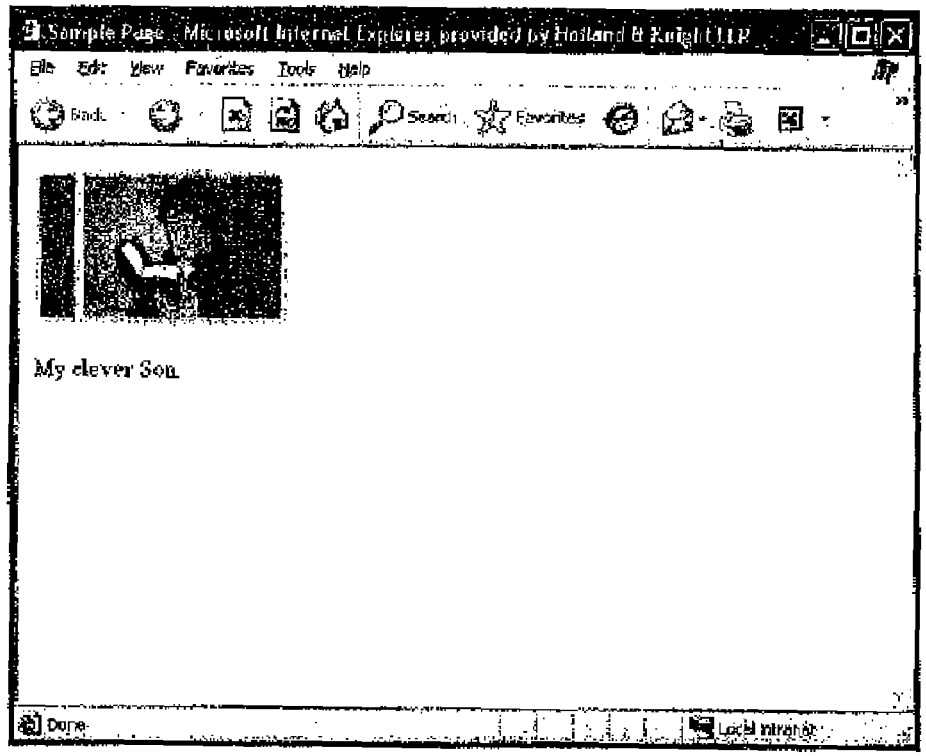
FIG. 1 is a screen shot demonstrating a web page viewed with INTERNET EXPLORER®.

Certain embodiments of the invention are directed to a method and apparatus used in conjunction with screen reading software, such as the JAWS® screen reader, available from Freedom Scientific, Inc., for synchronizing the screen reader's virtual representation of a component visually displayed to a sighted user. The discussion that follows below focuses on an embodiment of the present invention directed to synchronization of a webpage being navigated by a low-vision user, but a person having ordinary skill in the art would appreciate that any computer application that displays information to users visually could be utilized in the invention discussed herein. This detail assumes INTERNET EXPLORER® as the web browser in use however this concept may be translated to work with any other browsers.

Most applications developed for modern operating systems provide graphical representations of their information to their users. These applications usually rely upon underlying graphical user interface ("GUI") features and window managers to maintain a consistent look and feel. These window managers, which can be part of the underlying operating system, draw graphical windows and manage the creation, movement, destruction, sizing and other graphical manipulation of windows. These window managers also provide information concerning the GUI to the application or applications utilizing the GUI features, including location information, such as the coordinates of where the cursor is located. Users typically interact with these GUIs by way of various input devices, including a mouse, tablet, joystick, trackball, touchscreen or any other input device.

As an example, web pages contain a tremendous amount of information which is presented to a user in a particular fashion. Websites are "programmed" in HTML (hypertext markup language). The Document Object Model ("DOM") is a specification defining an application programming interface for documents developed by the World Wide Web Consortium ("W3"). The DOM specification, which is located at http://wvvvv.w3.org/, is hereby explicitly incorporated by reference. The DOM enables programmatic access to documents by providing a hierarchical, tree-like representation of the elements of structured documents like HTML and XML.

Web browsers typically rely upon the DOM for maintaining and navigating web pages. Other applications may rely upon an Application Programming Interface (or "API") to provide the relevant information. Embodiments of the invention herein described in more detail below utilizes an application's ability to interact with the physical characteristics of its presentation to provide enhanced functionality to low-vision users.

In order to facilitate speed in intersecting with the web browser, one embodiment of the present invention uses a COM (Component Object Model) control which is injected into the web browser application and thus is executed in the address space of the web browser application and communicates back to a client screen reader, such as the JAWS® screen reader, as necessary. This embodiment also uses a Document Object Model ("DOM") Module (FSDom Module) which communicates with the web browser via a translation layer, which in one embodiment is known as the FSDomNodeIE.dll. One possible implementation is the W3C Dom, although other object models can also be implemented. This enables the system to write different translation layers for different applications but use the same FSDom Module control to communicate with the application and assemble a virtual document representing the physical document in whichever application it is being utilized. Thus, for instance, the system can create a FSDomNodeFireFox.dll to serve as a translation layer between the FIREFOX® web browser and the screen reader's virtual document.

Figure 7:
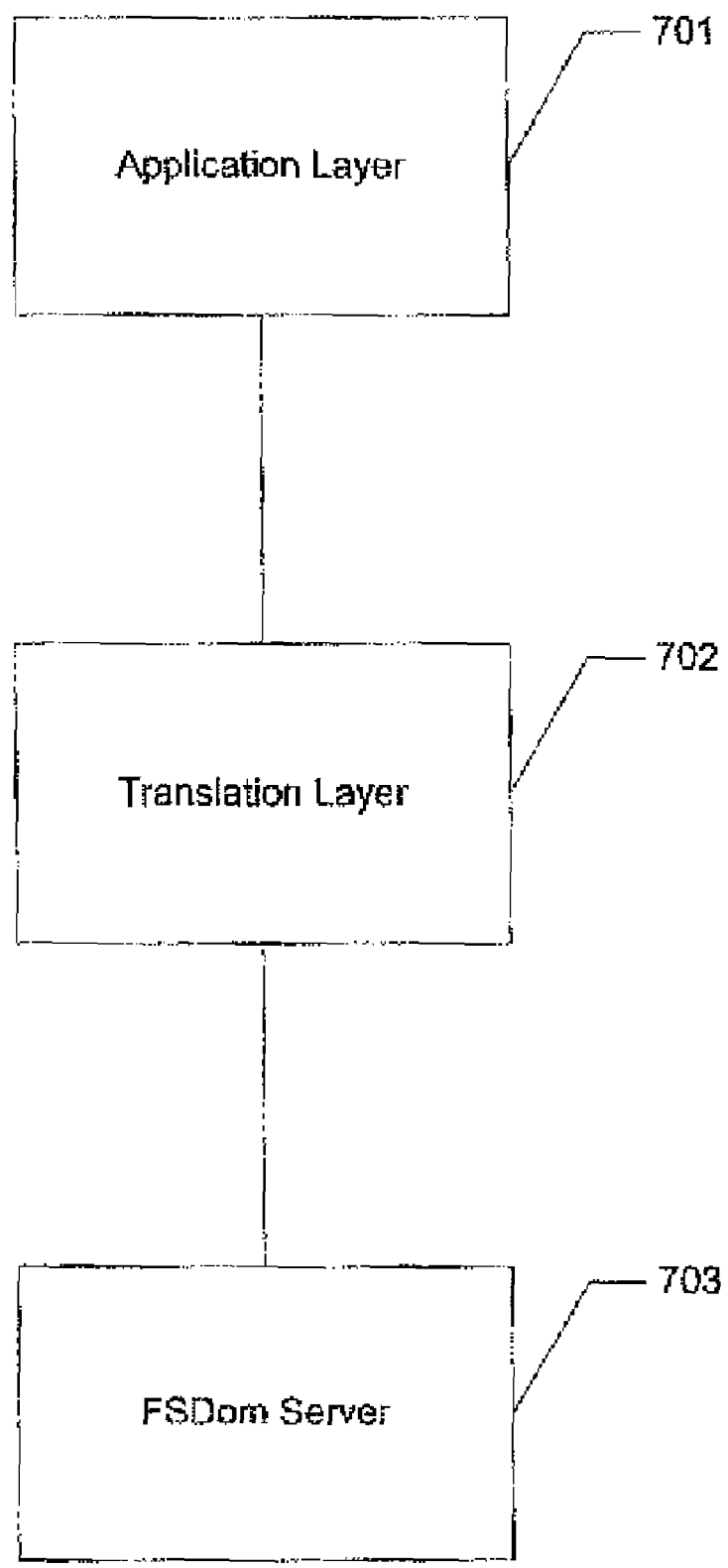
FIG. 7 is a high-level block diagram architecturally picturing the invention.

FIG. 7 provides a high-level architectural view. The application layer 701 would comprise INTERNET EXPLORER® in the example that follows. The translation layer 702 comprises the FSDomNodeIE.dll (or other code serving as a translation layer between the application and the FSDom Module). The FSDom Module 703, as described in more detail below, manages the translation between the physical document and the virtual document.

The FSDomNodeIE module provides the mechanism for traversing the document provided by the INTERNET EXPLORER® web browser to the FSDom Module which keeps track, via its own node tree, of the translation between the physical document and the virtual document created by the FSDom Module.

The FSDomNodeIE module uses interfaces provided by the underlying application, such as the IMarkupServices, IMarkup Pointer, IDisplayServices and IDisplayPointer as well as other interfaces provided by the MSHTML library of INTERNET EXPLORER®, to traverse the underlying web document and interact with the elements of the document on behalf of the FSDom Module. The implementation of this would be known to one of ordinary skill in the art. Once FSDomNodeIE is injected into Internet Explorer, the FSDomNodeIE code attaches an event sink or listener to the Browser object (IWebBrowser2). When this sink receives notification that a new document has been loaded, the virtual buffer is constructed and event sinks are attached to the document itself (IHTMLDocument2) and to each element of the document (THTMLElement). This allows certain portions of the virtual buffer to be rebuilt when notification of document changes are received from the document or one of its elements. This FSDomNodeIE module (or other translation layer module) traverses the web browser's document and creates a node for each document element, assembling them into a tree structure which is then traversed by the FSDom Module. Each element of the DOM has an associated tag and attributes. Using this information it is possible to determine the type of each element and processes it appropriately. Since each node maintains information about the physical element to which it points in the underlying web document, the node is able to offer functions to the FSDom Module to provide details about the physical onscreen location and characteristics of the piece of information represented by the underlying element. As the FSDom Module traverses the node tree, it builds a virtual document representing the physical document replacing graphical images with text descriptions and augmenting the physical document with other textual descriptions such as the rubber of rows and columns in a table of information or the number of items in a balloted or numbered list.

As part of walking the DOM to construct the virtual buffer, information is gathered about every table including the row and cell count and where in the virtual buffer each cell begins/ends. This makes it possible to find the associated table cell (if any) for any offset in the virtual buffer and vice versa.

A similar technique is used for lists, wherein the count of elements in each list along with the starting and ending location of each list item is associated with offsets in the virtual buffer.

For each virtual element added to the document, the FSDom Module is thus able to ask, or call back on, the node to interact with the physical element represented by the virtual element in the virtual document. As the FSDom Module traverses the node tree, it also updates the node's location in the virtual document so that, for example, if the user selects some text in the virtual document, the characters selected in the virtual document can be mapped directly back to the physical onscreen data.

Several key functions help with this mapping, all of which are implemented in the translation layer module, in this case, FSDomNodeIE. The following pseudo code function signatures are:
   Virtual BOOL UnderlyingDocumentSupportsACP( )
   Virtual long GetUnderlyingACPForNodeOffset (long nOffsetInNode);
   virtual BOOL CopyRangeToClipboard (long nUnderlyingACPStart, long nUnderlyingACPEnd);
   virtual BOOL SelectRangeOnScreen (long nUnderlyingACPStart, long nUnderlyingACPEnd);

The first function, UnderlyingDocumentSupportsACP( ) is used to determine if the translation layer, in this case FSDomNodeIE, is able to provide a mapping to the underlying document's representation at an Absolute Character Position ("ACP") (or screen location) granularity. If not, the translation layer may not be able to accurately determine the exact offsets to highlight on the screen. Note that if the underlying application does not allow this mapping, it is still possible to provide an approximated mapping by selecting the nearest physical element. While this may not be suitable for selecting onscreen data, it may be useful in at least highlighting the current element being voiced by the screen reader.

The second function, GetUnderlyingACPForNodeOffset (longnOffsetInNode) will, given a document, offset in the virtual document relative to this node, obtain the Absolute Character Position of the equivalent piece of data in the physical web document. An example may suffice.

Suppose the physical document consists of the webpage as shown in FIG. 1. To a low vision user, a screen reader would render the webpage shown in FIG. 1 to indicate there is an "image of a boy reading" and then the text "My clever son." The HTML for this webpage comprises:
<img src= . . . alt="image of a boy reading"><P>My <B>clever</B>Son.</P>

Note that quotes are used to show spacing and are not included in the offset discussion below. This would be represented by markup pointers in INTERNET EXPLORER® as depicted in FIG. 3. The first column of FIG. 3 stores the Absolute Character Position of the document element being maintained. The second column serves to provide a description, and the third column shows the actual data. Walking through the example code discussed above, the first entry in the table represents the first physical character of the string of html as an image. This corresponds to the <img . . . tag above.

The next row in the table indicates that at absolute character position 1 is the <p> tag, used for defining a paragraph in HTML. Further note the description maintains the element at character position 1 is described as "EnterScope Paragraph" as the <p> is the beginning of this Paragraph scope.

The next row is the first piece of text in the above example, namely the letters and space "My". As is appreciated by one skilled in the art, these three characters are positioned at absolute character positions 2-4, where position 2 is 'M', position 3 is 'y' and position 4 is ' '.

As with the <p> tag above, the next character is a formatting character, namely the <b> tag, used to indicate the beginning of text that, should be presented in boldface. The next element corresponds to absolute character positions 6-11, which is where "Clever" is displayed. Next up is the </b> tag at absolute character position 12, which indicates the end of the bold face scope, which had begun at absolute character position 5. The remainder of FIG. 3 provides the same information for the rest of the HTML of the webpage depicted in FIG. 1.

The FSDom Module's virtual representation of the same web page is shown in FIG. 4. Note that FIG. 4 contains the same three columns, but the data stored in each is different than what was stored in FIG. 3. As the presentation under this approach is to a low-sighted user, instead of displaying the actual image of the boy reading, the low-vision user is read the alternate text that is provided in the <img . . . > tag. This alternate text, "Image of a boy reading" is located in character positions 0-21, as indicated in FIG. 4

The next two lines in the table shown in FIG. 4 correspond to the <p> tag that was represented in the second row of the table in FIG. 3. The next row of FIG. 4 is used to store information concerning the text "My". Note the character position for this text in FIG. 4, namely 24-26, is different than the character position stored in the table of FIG. 3 for this same element. This is because in FIG. 3, the display considers the actual image of the boy reading to comprise a single position, whereas now, for the low-vision user, the display (which is the screen reader that reads the information to the low-vision user) must store and read the alternate text, specifically "Image of a boy reading." Furthermore, in the FIG. 3 table, the paragraph tag <<p>> takes up only a single character position, while the screen reader version in FIG. 4 requires two character spaces.

This enables the invention disclosed herein to maintain a mapping of virtual document elements to their physical Absolute Character Position, as shown in FIG. 5. The Node Offset in virtual column of the table in FIG. 5 keeps track of how large the offset for the particular element is in the virtual document. Thus, as shown in the first row, the < i mg > element, which takes up only a single character position in the physical character representation, takes up 22 character positions in the virtual document. Similarly, as shown in the second row of the table in FIG. 5, the <p> tag, which takes up a single character position in the physical document, occupies two character positions within the virtual document. This first column of the table in FIG. 5 keeps track of relative offsets within a particular node. Thus, looking at the third row down (namely the row for the physical element "My"), the first column indicates that there are only three character positions within this element.

The second column, Virtual ACP, stores the corresponding information from the table shown in FIG. 4, while the third column. Physical ACP, provides the information from the table shown in FIG. 3. Finally, the last column, Physical Element, depicts what the actual element being stored is. By managing the information in this manner, the screen reader application and translation layer, combined with the FSDom Module, is able to seamlessly integrate with window management systems and provide the same functionality to low-vision users as sighted-users take for granted.

Thus, embodiments of the invention are suitable for use with any application that has the ability to use a cursor to manipulate, change, highlight, copy, cut, select, or otherwise modify what is shown on the display. All that must be done is the creation of a suitable translation layer capable of mapping the display events to absolute character positions.

Figure 2:
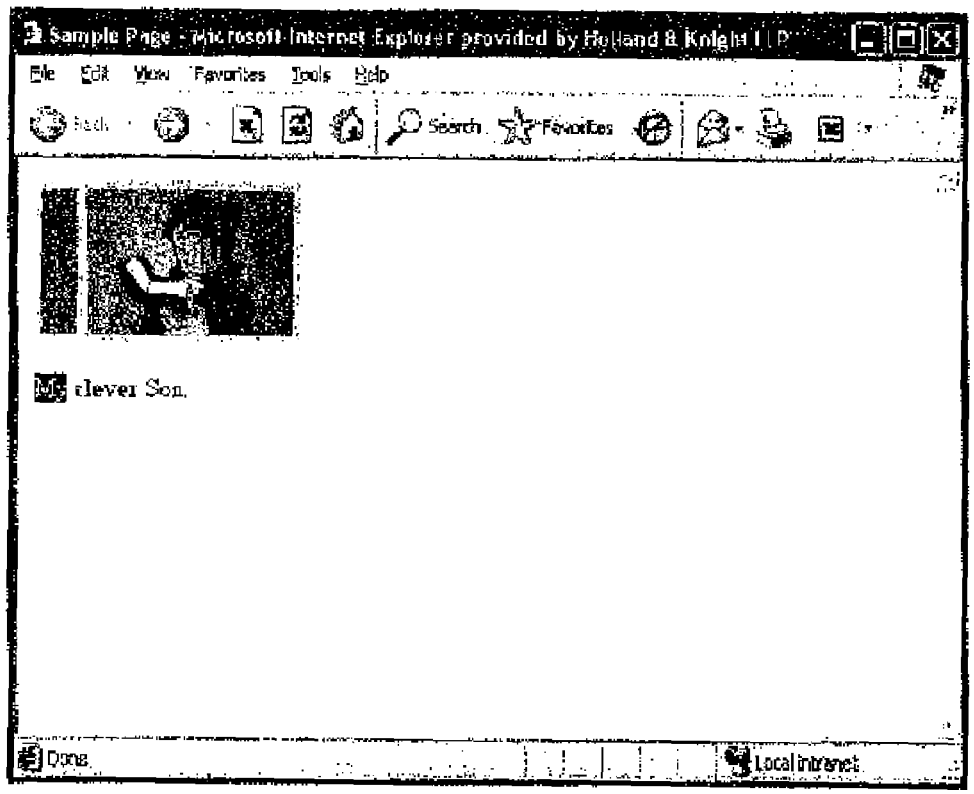
FIG. 2 is a screen shot of the same web page viewed in FIG. 1 with a portion of the text highlighted.

FIG. 2 shows the webpage of FIG. 1 after a user has selected the word "My". A sighted user would accomplish this by using her mouse or any other input device to select this text. Note that the webpage is now displayed to a sighted-user with the word "My" highlighted. To accomplish this same task, a low-vision user would use the virtual cursor provided by the screen reader to select the word "My". The system described herein then selects the text in the virtual document from virtual offset 24 to 25, as this represents the word "My" (without the trailing space). Using the mappings described above, the system can then compute the Absolute Character Position for the virtual cursor. Thus, virtual offset 24 to 25 will be mapped back to the physical ACP 2-3, which represents the word "My" as the web browser application displays it. The system herein then communicates this information back to the web browser application, so that the application can highlight the selected text, just as it did when a sighted user selected the text using a mouse.

At this point, methods are provided to select and copy information within, the web browser's application space. In the INTERNET EXPLORER® example discussed above, CopyRangeToClipboard (long uUnderlyingACPStart, longn UnderlyingACPEnd) and SelectRangeOnScreen (long uUnderlyingACPStart, long nUdnderlyingACPEnd) are provided Absolute Character Position parameters, and then interact with INTERNET EXPLORER®'s document representation, and can call INTERNET EXPLORER®'s native library functions to do the copying or onscreen selection.

For instance, the translation layer can utilize the MSHTML library's ITextRange interface to create the appropriate text range representing the data between the ACR values specified and is able to call ITxtRange::Select or ITxtRange::Copy to select the range on screen or copy the range to the clipboard.

By having a suitable translation layer for other applications such as Firefox, Adobe Reader, Adobe Acrobat, Microsoft Word, Microsoft Excel, and any other computer application which presents information to users, the FSDom Module is able to determine the capability of the underlying application and perform onscreen selection and copy to clipboard functionality. If the FSDom Module determines that this capability is unavailable in the underlying application because the underlying application does not have the necessary functionality or the translation layer doesn't yet implement this functionality, the FSDom Module is still able to copy a representation of the data to the clipboard but is unable to highlight the appropriate data on the screen and the data copied will be our representation of the data rather than the physical data from the application.

Figure 6:
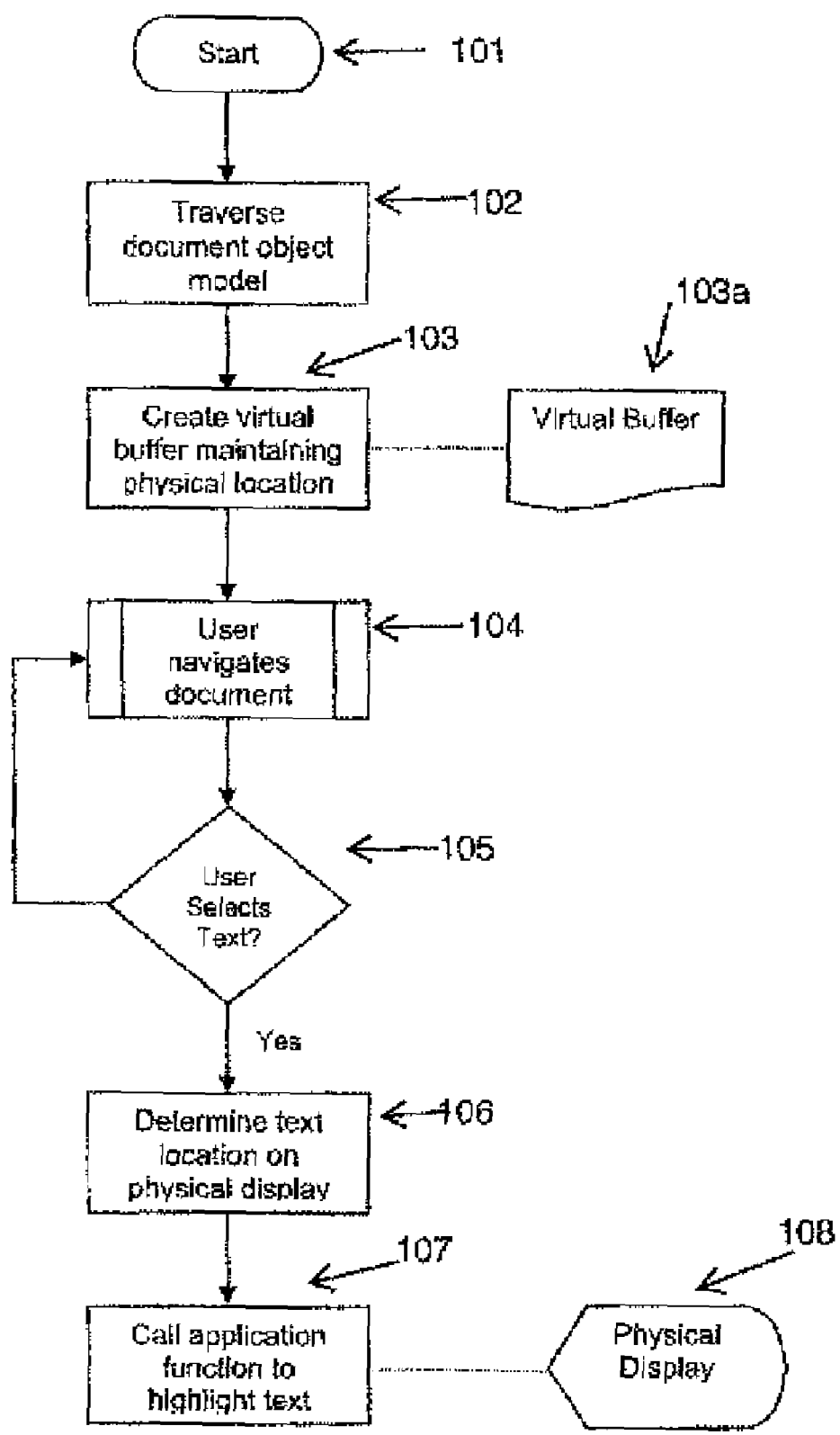
FIG. 6 is a high-level block diagram of the invention.

This process is further described, by reference to FIG. 6. FIG. 6 shows a flow chart laying out a usage scenario of a low-vision user utilizing the invention herein. At step 101, the user begins to receive a document in the screen reader. The screen reader traverses the document object model at step 102, and creates a virtual buffer 103a at step 103. FIG. 4 shows a sample virtual buffer 103a for the example discussed above. Steps 104 and 105 depict the event loop during which the low-vision user peruses the virtual document. When the low-vision user selects text within the virtual document at step 105, the internal mappings discussed at FIG. 5 are consulted to determine the physical location of the text at step 106. Finally, the application is called to highlight the text at step 107. The physical display is a step 103.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for permitting a low-vision user to synchronize two documents, the method comprising:
   providing an application residing on a computer, the application generating a visible document, the visible document including graphic and text elements that are visually displayed to the low-vision user by the computer, the graphic and text elements being arranged into a document object model;
   providing translation and server modules residing on the computer, the translation and server modules interacting with the application;
   traversing the visible document with the translation module and creating a node for each graphic and text element, the nodes being arranged into a node tree;
   traversing the node tree with the server module to create a virtual document, the virtual document comprising a representation of the visible document and including elements that correspond to the graphic and text elements of the visible document;
   the server module inserting text descriptions in the virtual document in place of the graphic elements in the visible document;
   the server module also inserting augmented text descriptions in the virtual document in place of the text elements in visible document;
   displaying the virtual document to the low-vision user by way of a screen reader;
   mapping offsets between elements within the virtual document to corresponding elements within the document object model and storing the mapped offsets in a virtual buffer;
   selecting virtual document elements within the virtual document and determining the location of corresponding elements within the visible document via the mapped values stored in the virtual buffer;
   visually displaying the selected elements in the visual document.

2. A method for synchronizing visible and virtual documents for a low-vision user, the method comprising the following steps:
   providing the visible document and a corresponding document object model by way of an application residing on a computer;
   providing translation and dom modules that interact with the application;
   traversing elements within the visible document via the translation module to create a node tree;
   traversing the node tree via the dom module to create the virtual document;
   replacing via the dom module any graphic elements within the visible document with text descriptions in the virtual document;

mapping offsets between the elements in the virtual document to corresponding elements in the document object model and storing the mapped offset values in a virtual buffer;

displaying the virtual document to the low-vision user;

selecting elements within the virtual document and determining the location of corresponding elements within the visible document via the mapped offset values stored in the virtual buffer;

visually displaying the selected elements in the visible document.

3. The method as described in claim 2 wherein the virtual document includes textual descriptions of tabular data such as header information and the number of rows or columns.

4. The method as described in claim 2 wherein the application is a web browser.

5. The method as described in claim 2 wherein the application is a word processor.

6. The method as described in claim 2 wherein the dom module is used to selectively augment text descriptions within the visible document.

7. The method as described in claim 2 wherein the virtual document is read by a screen reader.

8. The method as described in claim 2 wherein the dom module employs the Document Object Model standard.

9. The method as described in claim 2 wherein the dom module employs an Application Programming Interface.

10. A method for synchronizing documents comprising the following steps:

generating a visible document and a document object model by way of an application residing on a computer, the visual document adapted to be read on a computer;

creating a node tree, with the individual nodes corresponding to elements within the physical document;

creating a virtual document by traversing the node tree, the virtual document residing on the computer and adapted to be read by a screen reader;

replacing graphic elements within visible document with text descriptions in the virtual document;

mapping offsets between the virtual document and the document object model and storing the mapped offset values in a virtual buffer;

interacting with elements within the virtual document and thereafter determining the corresponding location of elements within the visible document via the mapped offset values stored in the virtual buffer;

visually displaying the interaction in the virtual document.

11. The method as described in claim 10 wherein the virtual document includes textual descriptions of tabular data such as header information and the number of rows or columns.

12. The method as described in claim 10 wherein the low-vision user selects the text descriptions for inclusion in the virtual document.

* * * * *

UNITED STATES PATENT AND TRADEMARK OFFICE
CERTIFICATE OF CORRECTION

PATENT NO. : 8,234,593 B2  
APPLICATION NO. : 12/399523  
DATED : July 31, 2012  
INVENTOR(S) : Glen Gordon and Joseph Stephen Page 1 of 1

It is certified that error appears in the above-identified patent and that said Letters Patent is hereby corrected as shown below:

In the Specifications:

Col. 4, line 66, the term "a balloted" should be "a bulleted".

Col. 8, line 3, the term "is a step 103" should be "is a step 108.".

Signed and Sealed this  
Third Day of September, 2013

Teresa Stanek Rea  
*Acting Director of the United States Patent and Trademark Office*